(12) United States Patent
Sugerman

(10) Patent No.: US 7,481,874 B2
(45) Date of Patent: Jan. 27, 2009

(54) FAST DRYING COATING

(76) Inventor: Gerald Sugerman, 8 Cambridge St., Allendale, NJ (US) 07401

( * ) Notice: Subject to any disclaimer, the term of this patent is extended or adjusted under 35 U.S.C. 154(b) by 378 days.

(21) Appl. No.: 10/653,863

(22) Filed: Sep. 3, 2003

(65) Prior Publication Data
US 2004/0211333 A1 Oct. 28, 2004

Related U.S. Application Data

(60) Provisional application No. 60/408,951, filed on Sep. 5, 2002.

(51) Int. Cl.
*C09D 11/00* (2006.01)
(52) U.S. Cl. ............. 106/31.13; 106/31.27; 106/31.6; 106/31.58; 106/31.86
(58) Field of Classification Search ............ 106/31.13, 106/31.6, 31.58, 31.86, 31.27
See application file for complete search history.

(56) References Cited

U.S. PATENT DOCUMENTS

| 3,627,685 | A |   | 12/1971 | Lam |
|---|---|---|---|---|
| 3,804,640 | A |   | 4/1974 | Buckwalter |
| 3,919,348 | A | * | 11/1975 | Foster et al. ................ 336/219 |
| 5,141,562 | A | * | 8/1992 | Cells ......................... 106/310 |
| H001517 | H | * | 2/1996 | Erickson et al. ............. 523/400 |
| 5,552,467 | A |   | 9/1996 | Reiter et al. |
| 2004/0009294 | A1 |   | 1/2004 | Kuribayashi et al. |
| 2004/0069182 | A1 | * | 4/2004 | Nakajima ................ 106/31.13 |

FOREIGN PATENT DOCUMENTS

GB    1279258 A * 6/1972

OTHER PUBLICATIONS

International Search Report for PCT/US03/27573; mailed Feb. 26, 2004.

* cited by examiner

*Primary Examiner*—Helene Klemanski
*Assistant Examiner*—Veronica Faison Gee

(57) ABSTRACT

The invention relates to compositions, methods of making the compositions, and methods of using the compositions for coating applications. The coatings are suitable as inks, varnishes, paints, and the like. In one aspect the coatings are fast drying, relative to existing technologies, and offer other advantages (e.g., print quality, color fastness, reduced or no VOC components, reduced or no toxic metal-containing components) useful in print and coatings applications.

30 Claims, No Drawings

FAST DRYING COATING

CROSS-REFERENCE TO RELATED APPLICATIONS

This application claims benefit of U.S. application Ser. No. 60/408,951, filed Sep. 5, 2002, which is incorporated by reference in its entirety.

BACKGROUND

Conventionally, lithographic (litho) inks, and varnishes have been designed to dry via combination of solvent evaporation and oxidative polymerization of unsaturated components.

Consequent to increasing concerns regarding the health, safety, and environmental impacts of volatile organic compounds, (VOCs); the contribution of this component (the evaporation of solvent is presently responsible for the major proportion of conventional litho inks' and varnish's drying speeds) to drying rates is anticipated to shrink in the future, as increasingly stringent limitations are placed on the usage of VOCs. Stacking of fresh prints in order to conserve space, which is typical during long runs, frequently limits the efficacy of solvent evaporation as a drying mechanism. Additionally the incorporation of solvents in litho inks results in undesirable distortion (e.g., capillary spread prior to drying) of applied ink droplets (dot gain), thus limiting print resolution. The extent of dot gain beyond that consequent to the small proportion resulting from the mechanics of imperfect application of ink to a moving substrate tends to be roughly proportional to the percentage of VOCs employed, hence solvent incorporation into litho ink formulations often limits print quality.

The oxidative-polymerization component of the drying of present litho inks almost invariably requires acceleration by toxic heavy metals such as cobalt and manganese, and is often kinetically limited by oxygen availability, especially when printing on essentially non-porous surfaces, and/or when fresh prints are stacked tightly, minimizing air access. A number of technologies have been developed to overcome drying rate limitations of conventional litho inks; these acceleration techniques include, the inclusion of various energy input systems, such as thermal energy (headset, and infrared drying), electron beam (EB), and ultraviolet (UV) radiation. The latter methodology typically requires incorporation of substantial proportions of a combination of expensive, and often-toxic photo initiators, and related auxiliaries, in addition to the expensive hardware, intensive energy consumption, and radiation exposure hazards, implicit in the generation of short wave length radiation used in both EB and UV based curing systems.

U.S. Pat. No. 5,552,467 teaches the usage of thermally activated combinations of chemical reducing agents, and organic (hydro)peroxides, one placed in the ink and the other contained in fountain solution as a means of overcoming the oxidative-polymerization drying component rate limitations of heat set lithographic inks. The patent discloses the use of two-part systems that inherently exclude usage in single fluid inks, and is limited further limited by the reactivity of the components, resulting in relatively short shelf life of solutions and/or dispersions of many organic (hydro)peroxides, and of reducing agents in unsaturated oil based vehicles, especially those containing carbon black an/or heavy metal based pigments, and in gum containing fountain solution concentrates. The specified technology has not been claimed to be effective for use in systems which must dry at/or near ambient temperatures.

U.S. Pat. No. 5,173,113 teaches the utility of hydrogen peroxide as a fountain solution additive for the acceleration of drying of lithographic inks, by a factor of approximately twofold. This combination, however, is used as a two-part system, thus inherently precluding use in single fluid inks. This material, often is frequently unstable in the presence of variable valence metals, glycol ethers, nitrogenous materials such as amines and amides, and reducing agents such as aldehydes, ketones, and alcohols; thus liming the shelf life of materials containing same.

It has now been found that he drying rates of most lithographic inks is advantageously enhanced by the utilization of low levels (10 to 20,000 parts-per-million (ppm)) of inorganic peroxy acid salts, (cofactor reducing agents are not required) as replacements for the activated organic (hydro)peroxide-reducing agent combination(s) and/or hydrogen peroxide fountain additive drying accelerators previously disclosed.

SUMMARY

The invention relates to compositions, methods of making the compositions, and methods of using the compositions for coating applications. The coatings are suitable as inks, varnishes, paints, and the like. In one aspect the coatings are fast drying, relative to existing technologies, and offer other advantages (e.g., print quality, color fastness, reduced or no VOC components, reduced or no toxic metal-containing components) useful in print and coatings applications.

In one aspect, the invention is a composition having a lithographic ink or varnish and catalytic proportions of one or more inorganic salts of peracids. The compositions are also any delineated herein: wherein the lithographic ink or varnish includes from about 10 to about 25,000 parts per million by weight of inorganic salts of peracids. The compositions are any delineated herein: further including one or more additional ink vehicle components (e.g., solids, alkyds, polyesters or polyamides); wherein the inorganic salt of a peracid is a compound of Table A; having any compound that is any of those delineated in a table herein (e.g., Table A or Table 1-4); further including pigment; or further including water.

Another aspect of the invention is a composition having a lithographic ink fountain solution including from 10 to 25,000 parts per million by weight of one ore more inorganic salts of peracids. The compositions can be any of those delineated herein wherein the lithographic ink fountain solution concentrate includes from about 50 to about to 250,000 parts per million by weight of one or more inorganic salts of peracids.

In another aspect, the invention relates to composition that is a single fluid lithographic ink or varnish having from about 10 to about 25,000 parts per million by weight of one or more inorganic salts of peracids.

Another aspect is a method of printing including using an ink having any of the compositions delineated herein, including those having a lithographic ink or varnish and catalytic proportions of one or more inorganic salts of peracids. The methods are also those wherein the printing includes applying the ink to a press; wherein the printing is lithographic printing; and wherein the printing includes printing on paper.

In another aspect, the invention relates to a method of printing including using an ink vehicle having any of the compositions delineated herein, including those having a lithographic ink or varnish and catalytic proportions of one or more inorganic salts of peracids. The method can be that wherein the ink vehicle is mixed with a fountain solution; or that wherein the fountain solution further includes an organic (hydro)peroxide or an inorganic salt of a peracid.

Another aspect is a composition made by the process of combining a lithographic ink or varnish and catalytic proportions of an inorganic salt of a peracid; or by the process of combining a composition havening a lithographic ink or varnish and catalytic proportions of an inorganic salt of a peracid, with water.

In another aspect, the invention relates to a method of painting a surface including combining any of the compositions delineated herein, including those having a lithographic ink or varnish and catalytic proportions of one or more inorganic salts of peracids, with water immediately prior to application of the resulting composition to the surface, and applying the resulting composition to the surface.

In another aspect, the invention relates to a method of sealing two surfaces together including combining a composition of any of the compositions delineated herein, including those having a lithographic ink or varnish and catalytic proportions of one or more inorganic salts of peracids with water immediately prior to application of the resulting composition to the surface. The method can further include combining a composition of any of the compositions delineated herein, including those having a lithographic ink or varnish and catalytic proportions of one or more inorganic salts of peracids with water immediately prior to application of the resulting composition to the surface, applying the resulting composition to the two surfaces, and contacting the two surfaces together.

Another aspect is the method of making a composition including combining a lithographic ink or varnish and catalytic proportions of an inorganic salt of a peracid. The method can further include combining water (e.g., air, water source, other moisture source).

In another aspect, the invention relates to a method of printing including combining a composition of any of the compositions delineated herein, including those having a lithographic ink or varnish and catalytic proportions of one or more inorganic salts of peracids with water (e.g., air, water source, other moisture source). The method can further include applying the resulting composition, from the combining of a composition of any of the compositions delineated herein with water, to a printing press; and that wherein the combining of any compositions delineated herein with water occurs immediately prior to applying the resulting composition (from the combining with water) to a printing press. The method can further include contacting the composition or ink vehicle delineated herein with a fountain solution immediately prior to use in printing or immediately prior to application to a printing press. The method can further include contacting the composition or ink vehicle delineated herein with water (e.g., air, water source, other moisture source) immediately prior to use in printing or immediately prior to application to a printing press.

In one aspect, the compositions are any of those delineated herein wherein they comprise reduced levels (relative to conventional amounts, e.g., <1 weight %, 0.05 to 0.7 weight %, of metal), or are devoid of, toxic heavy metals (e.g., cobalt, manganese), including in elemental or salt forms.

The use of inorganic peroxy salts, as opposed to that of either organic(hydro)peroxides, or hydrogen peroxide, when employed in conjunction with either conventional or single fluid lithographic inks, has been found to minimize formulation stability problems, since most inorganic peroxy salts have minimal solubility in the oil based ink phase, and insufficient oxidation potential to significantly damage most fountain solutions and or related concentrates, under normal use and/or storage conditions.

The introduction of said (meth)acrylates, allyl, and/or vinyl ethers as (optionally partial) solvent replacements, not only substantially enhances the drying acceleration effects of (organic (hydro)peroxide—reducing agent combinations, and/or fountain solution hydrogen peroxide addition, taught by the prior art, but additionally provides significant aesthetic improvements relative to the prior art. These improvements include the minimization of dot gain, and of ghosting (penetration of porous substrates by ink via capillary wetting), increased gloss potential, and enhanced pigment dispersion rates. The upgrades enabled via the application of the teachings of this invention permits the formulator to design reduced and/or solvent free litho inks, superior to their conventional, (alkyd-polyester-resin) based solvent borne analogs. The use of inorganic peroxy salts, as opposed to that of either organic(hydro)peroxides, when employed in conjunction with either conventional or single fluid lithographic inks, either in the ink or fountain solution, has been found to minimize formulation stability problems, since most inorganic peroxy salts have minimal solubility in the oil based ink phase, and insufficient oxidation potential to significantly damage fountain solutions and or related concentrates, under normal use and/or storage conditions.

As a practical matter, this invention teaches the use of inorganic peroxy acid salts as drying rate accelerators in lithographic ink systems These peroxy acid salts may, usefully, be incorporated into the ink and/or into the fountain solution (when employed in wet plate (dual fluid) lithography), at levels of the order of about 10 to about 5,000 parts per million (ppm). When said accelerators are activated via thermolysis, hydrolysis or by dispersion as an aqueous solution in the lithographic ink via readily applicable techniques, e.g. mechanically, chemically, thermally, and/or by exposure to radiation, these nascent free radical sources decompose to free radicals which affect rapid polymerization based cure of the ink.

The details of one or more embodiments of the invention are set forth in the accompanying drawings and the description below. Other features, objects, and advantages of the invention will be apparent from the description and drawings, and from the claims.

DETAILED DESCRIPTION

The compositions and methods of the invention relate to coatings, and in one aspect inks. Materials that are standard and conventional in the art are suitable for use in the compositions and methods herein.

Lithographic printing is the art or process of printing from a flat plate in which the desired image is achieved by construction of said plate such that selective adhesion of the printing ink to plate occurs in the desired image area(s), followed by contact transfer of said image either directly, or indirectly to a substrate (e.g., paper, plastic, metal).

Unsaturated fatty acids are defined as materials having the composite structure $HOC(O)(CR^1R^2)_n(R^3C=CR^4)_m R_7$, wherein m is an integer from one to about 5, wherein n is an integer from 3 to about 20, and wherein each of the various R groups (e.g., $R^1$, $R^2$, $R^3$, $R^4$) is independently chosen from among hydrogen or is a monovalent hydrocarbyl group having from one to about four carbon atoms. The various $(CR^1R^2)$ and $(R^3C=CR^4)$ need not be consecutive or in conjugation, but may be connected to each other in any order.

Unsaturated fatty acids useful in the compositions and methods herein include, for example, those listed in the tables herein.

(Meth)acrylate esters are herein defined as materials having the general structure [RCH$_2$=CHC(O)O]nR', wherein n is an integer larger than 1; each R is independently chosen from hydrogen, or a CH$_3$ group, and R' is chosen from among hydrocarbyl groups having from two to about 20 carbon atoms each, except that the number of carbon atoms in each R' must equal or exceed n. (Meth)acrylate esters useful in the compositions and methods herein include, for example, those listed in the tables herein.

Inorganic salts of peracids (or peroxy acids) are herein defined as salts of acids containing the structure (O—O$^-$), in which the cation has a positive electrical charge on an atom other than hydrogen, or carbon. Inorganic salts of peracids useful in the compositions and methods herein include, for example, those listed in the tables herein. In some aspects of the invention, the inorganic salts of peracids are used in catalytic amounts (e.g., less than about 0.5 weight percent, less than about 0.25 weight percent, less than about 0.1 weight percent, based on total weight of the composition).

Organic hydroperoxides are defined as an organic compound containing the structure C—O—O(R) wherein R is a chosen from among hydrogen, or a group bonded through carbon to the peroxide oxygen. Organic hydroperoxides useful in the compositions and methods herein include, for example, those listed in the tables herein.

Multifunctional vinyl ethers are herein defined as organic chemicals which contain the structure [RRC=CRO]nR' wherein n is a n integer larger than 1; each R is independently chosen from hydrogen, or a CH$_3$ group, and R' is chosen from among hydrocarbyl groups having from two to about 10 carbon atoms each.

A fountain solution is herein defined as an aqueous solution that maintains the hydrophyllic oleo phobic balance of the non-image to the image area on a planographic plate as well as maintaining a protective film to prevent oxidation of the non-image areas.

Pigments are a colored particulate which is essentially insoluble in its vehicle. Pigments can be in any of a variety of colors and are exemplified by those delineated in the examples herein.

Dot gain is herein defined as the expansion of the image (sub)components after application of same to the print substrate. This decreases detail clarity, and thus minimal dot gain is typically more desirable for higher clarity images.

The variety of (meth)acrylate esters, and vinyl or allyl ethers, useful in the practice of this invention is very large, however for the sake of brevity, only representative examples of preferred members of each class of materials are provided in the examples herein. The examples provided hereinafter are intended to be illustrative of, and not to exhaustive of nor to limit the scope of this invention. Those skilled in the art will easily be able to provide many more examples of each class of such components with minimal difficulty, and without departing from the teachings of this invention.

An ink vehicle is a combination of components that are suitable for ink compositions. In one aspect, the ink vehicle contains certain components that are incompatible for storage with other ink components (i.e., when in contact, an irreversible reaction takes place, which may be undesirable or may be desired to be controlled such that the reaction takes place immediately prior to, or concurrent with, use of the resulting product (e.g., ink) for printing). In such instance, one of the incompatible components is placed in the ink vehicle and the other is placed in a second ink vehicle (e.g., fountain solution) for mixing immediately prior to, or concurrent with, use. The ink vehicle can include any of the materials delineated herein, or can also include any standard ink vehicle component know in the art, including for example, solids, alkyds, polyesters or polyamides suitable for ink or printing compositions, and the like. The same material can be considered a varnish when pigments are absent from the composition. Varnishes are expressly considered one aspect of the compositions delineated herein.

The compositions herein are useful in lithographic printing applications. Such applications can be intaglio or off-set, including sheet-fed, cold-web, and heat set web printing. The teachings of this invention are beneficial and applicable in the practice of letterpress, sheetfed, heatset and coldset forms of lithography; providing in each instance the opportunity to achieve faster production of improved products.

The number and variety of nascent free radical sources, useful in the practice of this invention is very large, however for the sake of brevity, only 10 examples of such sources are provided, cf. Table A. Those peracid salts useful in conjunction with a specific lithographic printing press configuration may be selected, in part, by the means of activation techniques available. Other embodiments of the invention include those specifically delineated in the tables and examples herein. The examples provided hereinafter are intended to be illustrative of, and not to limit the scope of this invention.

TABLE A

| Material Designation | Peroxy acid salt | Incorporated into Ink (I) or Fountain Solution (F) | Preferred activation methodology |
| --- | --- | --- | --- |
| AA | sodium peroxy diphosphate | I or F | Water, humidity. |
| AB | sodium perborate | I or F | Water, humidity |
| AC | sodium persulfate | I or F | Water, thermal. |
| AD | sodium peroxy disulfate | I or F | Water, thermal, |
| AE | Calcium peroxy stannate | I or F | thermal, or radiation |
| AF | Aluminum percarbonate | I | Water, or thermal. |
| AG | Potassium perhenate | I or F | Thermal, radiation, |
| AH | Potassium peroxy molybdate | I | Thermal, or radiation |
| AI | magnesium peroxy tungstate | I | Water, humidity |
| AJ | sodium peroxy osmate | I or F | Thermal, radiation |

EXAMPLES

Example 1

Utility of Catalytic Proportions of Salts of Inorganic Peroxy Acids as Drying Accelerators for Single Fluid Lithographic Inks Black, single fluid, sheetfed litho ink was prepared by mechanically dispersing and three roll milling 400 g of Ultrex 110, 300 g of Nylin 5 (Lawter Chemical Co., gloss ink vehicles), 180 g of black pigment (No. R400R Cabot Corp.), 20 g of reflex blue pigment (BASF) 105 g of dipropylene glycol diluent, 4 g of polyethylene wax paste (No. Shamrock Industries), and 3 g of polytetrafluoro ethylene powder (Micro Powders-Flouo 60). Optionally accelerator, as specified, was added to the ink. Tack was adjusted to 8 at 1,200 RPM, via the addition of, additional diluent as specified.

The resulting inks were each separately evaluated by printing, using a 200-line screen at standard densities, on a calendared, uncoated 25 kg. paper stock, employing a Komori 0.4×0.6 meter sheetfed press, using Toyo plates, at maximum (drying rate, or press capability production rates—20,000 impressions/hr.) The resulting prints were each evaluated for drying rates, dot gain and minimum compression (psi) necessary to effect visually detectable offset, were also determined, and documented in Table 1. Substrate and printing environment were each maintained at 22° C. and 60% relative humidity, during printing.

TABLE 1

| ID | Diluent(s)-% | Accelerator-ppm | % Dot Gain | Max. comp. psi × 100 | Max print rate × 1,000 |
|---|---|---|---|---|---|
| 1A | Propylene glycol-22 | none | 31 | 0.65 | 11.4 |
| 1B | Propylene glycol-22 | AE-1,000 | 27 | 0.95 | 14.6 |
| 1C | Butoxy triglycol-25 | none | 25 | 0.73 | 11.7 |
| 1D | Butoxy triglycol-25 | AF-2,500 | 23 | 0.89 | 15.4 |
| 1F | Diethylene glycol-22 | none | 27 | 0.62 | 12.7 |
| 1G | Diethylene glycol-22 | AJ-500 | 18 | 0.93 | 14.9 |
| 1H | PEG 400-29 | none | 16 | 1.5 | 17.2 |
| 1I | PEG 400-29 | AG-40 | 11 | >3 | 19.7 |
| 1J | PEG 400-29 | AA-15,000 | 10 | >3 | >20 |

Notes:
1) PEG = polyethylene glycol

Example 2

Incorporation of Catalytic Proportions of Salts of Inorganic Peroxides, vs. Prior Art, in Conventional Lithographic Heatset Web Ink Yellow, red, cyan and black, litho heatset inks were prepared by mechanically dispersing and filtering (through a 5 micron filter) 400 g of A-1407, and 300 g of Ultrex 110 (Lawter Chemical Co., vegetable oil based gloss ink vehicles), 250 g of conventional ink oil diluent, 4 g of micronized polyethylene wax paste (Shamrock Industries), 20 g of micronized Aluminum carbonate, and 3 g of polytetrafluoro ethylene powder (Micro Powders-Flouo 60). 140 g of black pigment, and 10 g of alkali blue pigment, 125 g. of rubine pigment, 115 g of phthalocyanine pigment, and 105 g of AAA yellow pigments were used respectively to produce black, red, blue, and yellow colored inks Optionally accelerator, was added to the fountain solution or ink as specified. Tackometer tack was adjusted to 8 at 1,200 RPM, via the addition of 40 g of a combination of Exxate 200, diluent, and/or 3020 (Lawter Chemical Co. tung-linseed oil based gloss varnish) as required.

The resulting inks were each collectively evaluated by two-sided four color printing, using a 200-line screen at standard densities, on a coated 25 kg. paper stock, employing a Heidelberg 1 meter web heatset press, with a 9 meter 160° C. oven equipped with a 5° C. chill roll, using conventional aluminum plates, and a fountain solution of Lithofont 5000 (Unigraphics Corp.) at a conc. of 6 wt %. The minimum of IPA required to prevent scumming; accelerator as specified, were employed at maximum drying (offset limited) rate, or press capability (25,000 impressions/hr.) limited production rates. The resulting prints were each evaluated for drying rates, dot gain. print yield (average color mileage), minimum compression (psi) necessary to effect visually detectable offset. These are documented in Table 2.

TABLE 2

| ID | Accelerator-ppm, ink/font. sol | % Dot gain | Max. comp. psi × 100 | Max print rate × 1,000 |
|---|---|---|---|---|
| 2A | none | 31 | 1.5 | 17.7 |
| 2B[1] | hydrogen peroxide-1,000, F | 30 | 1.7 | 17.9 |
| 2C[2] | t-butyl peroxide-1,000 | 27 | 1.7 | 18.2 |
| 2D[2] | t-butyl peroxide-1,000, F FeSO$_4$- 850, I | 28 | 2.0 | 18.1 |
| 2E | AD-250, F | 24 | 1.9 | 21.4 |
| 2F | AF-5,000, I | 16 | 2.2 | 22.7 |
| 2G | AE-500, F | 18 | >2.5 | >25 |
| 2H | AH-70, I | 15 | >2.5 | >25 |
| 2I | AA-14, F | 19 | 1.8 | 20.6 |
| 2J | AA-14, I | 18 | 1.9 | 20.9 |

Note:
[1] peroxidelevel dropped by 45% in 8 hours storage @ 22° C.
[2] Ink Tack rose to 12 after 14 days of storage @ ~70° F.

Benefits demonstrated include: reduced dot gain, faster drying (enabling higher print rates), and, enhanced print compression pressure tolerance.

Example 3

Utility of the Incorporation of Catalytic Proportions of Salts of Inorganic Peroxides, vs. Prior Art, in Lithographic Cold Web Ink Yellow, red, cyan and black, litho heatset inks were prepared by mechanically dispersing and filtering (through a 5 micron filter) 300 g of A-1407, and 300 g of Ultrex 110 (Lawter Chemical Co., vegetable oil based gloss ink vehicles), 140 g of pigment 250 g of conventional ink oil diluent, 4 g of micronized polyethylene wax paste (Shamrock Industries), 10 g of micronized aluminum stearate, and 3 g of polytetrafluoro ethylene powder (Micro Powders-Fluoro 60). Optionally accelerator, was added to the fountain solution or ink as specified. Tack was adjusted to 7 at 1,200 RPM, via the addition of 40 g of a combination of Exxate 200 (ExxonMobil Corp.), diluent, and/or 3020 (Lawter Chemical Co. tung-linseed oil based gloss varnish) as required. Varnishes were produced @ 5 tack via the elimination of pigment from the above formulations.

The resulting sets of inks and varnish(es) were each collectively evaluated by two-sided four color printing, using a 200-line screen at standard densities, on an uncoated calendered 100 lb. paper stock, employing a Harris 1 meter cold web press, conventional aluminum plates, a fountain solution containing 85 g/l of Total fountain solution (Varn Corp.) 6 weight % butoxy ethanol was added to minimize scumming. Accelerator was incorporated into the ink and/or fountain solution as specified. Fountain solutions were prepared by dilution, with water, of accelerator containing concentrates. Printing was conducted at maximum offset, or press capability (25,000 impressions/hr.) limited production rates. The resulting prints were each evaluated for drying rates, dot gain, and minimum compression (psi) necessary to effect visually detectable offset.

TABLE 3

| ID | Accelerator-ppm, ink-varnish/font. soln. | % Dot Gain | Max. Comp. Psi × 100 | Max print rate × 1,000 |
|---|---|---|---|---|
| 3A | none | 34 | 1.6 | 14.7 |
| 3A | hydrogen peroxide-1,000, F | 32 | 1.7 | 16.9 |
| 3B[1] | t-butyl hydro peroxide-1,000 | 32 | 1.6 | 14..9 |
| 3C[1] | t-butyl hydro peroxide-1,000, I FeSO$_4$_ 850, F | 26 | 1.8 | 17.4 |
| 3D | AD-50, F | 24 | 2.4 | 20.4 |
| 3F | AB-500, I | 25 | 2.2 | 21.7 |
| 3G | AE-500, F | 24 | >2.5 | >25 |
| 3H | AH-70, I | 27 | >2.5 | >25 |
| 3I | AA-25, F | 28 | 2.1 | 22.4 |
| 3J | AA-25, I | 27 | 2.0 | >25 |

Note:
[1] Ink tack rose to 17 after eighteen days of storage @ ~70° F.

Benefits demonstrated include: reduced dot gain, faster drying (enabling higher print rates), and minimum compression (psi) necessary to effect visually detectable offset.

Example 4

Utility of Catalytic Proportions of Salts of Inorganic Peroxy Acids as Drying Accelerators for VOC Free Vegetable Oil Based Lithographic Inks Black, dual fluid, sheetfed litho ink was prepared by mechanically dispersing and three roll milling 400 g of 3020 (Lawter Chemical Co., tung-linseed oil based gloss ink vehicles), 180 g of black pigment (No. R400R Cabot Corp.), 20 g of reflex blue pigment (BASF) 70 g of the bis linolenate ester of 2,5-hydroxy, 1,4-bis oxa cyclohexanediol 70 g of linseed oil, and 10 g of polytetrafluoro ethylene powder (Micro Powders-Fluoro 60). Optionally accelerator, as specified, was added to the ink. Tack was adjusted to 12 at 1200 RPM, via the addition of, additional linseed oil. Cyan, rubine, and yellow analogs were prepared, by replacing the black and alkali blue used in the preceding formulations with 160 g of phthalocyanine blue, 180 g of rubine, or 145 g of yellow pigment respectfully. Optionally accelerator, was added to the fountain solution or ink as specified.

The resulting ink sets were each separately evaluated by printing, using a 200-line screen at standard densities, on a heavily coated 120 lb. paper stock, employing a 4 color Komori 0.4×0.6 meter sheetfed press, with conventional aluminum plates, and the indicated fountain solutions (6% concentrate), at the greater of maximum drying rate, or press speed capability (20,000 impressions/hr.) limited production rates. The resulting prints were each evaluated for drying rates, average color set dot gain, and the minimum compression (psi) necessary to effect visually detectable offset, were also determined, and documented in Table 4. Substrate and printing environment were each maintained at 22° C. and 60% relative humidity, during printing. Results are provided in Table 4.

TABLE 4

| ID | Fountain 1, 2 solution | Accelerator-ppm, ink-varnish/font. soln. | % Dot Gain | Max. Comp. Psi × 100 | Max print rate × 1,000 |
|---|---|---|---|---|---|
| 4A | 1 | none | 14 | 1.6 | 17.4 |
| 4B | 1 | hydrogen peroxide-1,000, F | 12 | 1.7 | 18.9 |
| 4C[1] | 1 | t-butyl hydro peroxide-1,000 | 15 | 1.6 | 17.9 |
| 4D[1] | 1 | t-butyl hydro peroxide-1,000, I FeSO$_4$_ 850, F | 12 | 1.8 | 19.2 |
| 4F | 1 | AD-50, F | 8 | 2.4 | >20.4 |
| 4G | 1 | AB-500, I | 6 | 2.2 | >20 |
| 4H | 1 | AE-500, F | 4 | >2.5 | >20 |
| 4I | 1 | AH-70, I | 8 | >2.5 | >20 |
| 4J | 1 | AA-25, F | 8 | 2.1 | 19.7 |
| 4K | 1 | AA-25, I | 7 | 2.0 | 19.9 |
| 4L | 2 | none | | | 7.6 |
| 4M | 2 | hydrogen peroxide-1,000, F | | <0.5 | 7.9 |
| 4N | 2 | t-butyl hydro peroxide-1,000, I FeSO$_4$_ 850, F | 13 | <0.5 | 14.3 |
| 4P | 2 | AD-50, F | 8 | 2.3 | >20 |
| 4Q | 2 | AA-25, F | 5 | 2.1 | >20 |

The dot gain in sheetfed applications of compositions of the invention falls into the range of −2 to plus 15% whereas conventional inks produce dot gains of 10-40%. Relative drying speeds (this invention vs. control ink) are documented in Tables 1-4 and all examples of compositions of the invention show dramatic speed enhancement vs. the control(s). Thus, the invention is also compositions and methods herein that show improved or enhanced print characteristics compared to controls in the examples herein, including those relative proportional improvements delineated in the examples between compositions of the invention and control compositions.

The compounds of this invention (including as used in compositions herein) may contain one or more asymmetric centers and thus occur as racemates and racemic mixtures, single enantiomers, individual diastereomers and diastereomeric mixtures. E-, Z- and cis-trans-double bond isomers are envisioned as well. All such isomeric forms of these compounds are expressly included in the present invention. The compounds of this invention may also be represented in multiple tautomeric forms, in such instances, the invention expressly includes all tautomeric forms of the compounds described herein. All such isomeric forms of such compounds are expressly included in the present invention. All crystal forms of the compounds described herein are expressly included in the present invention.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

All references cited herein, whether in print, electronic, computer readable storage media or other form, are expressly incorporated by reference in their entirety, including but not limited to, abstracts, articles, journals, publications, texts, treatises, internet web sites, databases, patents, and patent publications.

A number of embodiments of the invention have been described. Nevertheless, it will be understood that various modifications may be made without departing from the spirit and scope of the invention. Accordingly, other embodiments are within the scope of the following claims.

What is claimed is:

1. A composition comprising a lithographic ink or varnish and catalytic proportions of one or more inorganic salts of peracids, wherein the one or more inorganic salts of peracids are persulfate, peroxy disulfate, peroxy stannate, percarbonate, perhenate, peroxy molybdate, peroxy tungstate, or peroxy osmate salts.

2. The composition of claim 1, wherein the lithographic ink or varnish comprises from about 10 to about 25,000 parts per million by weight of one or more of the inorganic salts of peracids.

3. A composition comprising a lithographic ink fountain solution comprising from 10 to 25,000 parts per million by weight of one or more inorganic salts of peracids.

4. The composition of claim 3 wherein the lithographic ink fountain solution concentrate comprises from about 50 to about to 250,000 parts per million by weight of one or more inorganic salts of peracids.

5. A composition comprising, a single fluid lithographic ink or varnish and comprising from about 10 to about 25,000 parts per million by weight of one or more inorganic salts of peracids.

6. A method of printing comprising utilizing an ink comprising the composition of claim 1.

7. The method of claim 6, wherein the printing comprises applying the ink to a press.

8. The method of claim 6, wherein the printing is lithographic printing.

9. The method of claim 6, wherein the printing comprises printing on paper.

10. A method of printing comprising utilizing an ink vehicle comprising the composition of claim 1.

11. The method of claim 10, wherein the ink vehicle is mixed with a fountain solution.

12. The method of claim 10, wherein the fountain solution further comprises an organic (hydro)peroxide or an inorganic salt of a peracid.

13. The composition of claim 1 further comprising one or more additional ink vehicle components.

14. The composition of claim 13, wherein the additional ink vehicle components are solids, alkyds, polyesters or polyamides.

15. The composition of claim 1, wherein the inorganic salt of a peracid is, sodium peroxy diphosphate, sodium perborate, sodium persulfate, sodium peroxy disulfate, calcium peroxy stannate, aluminum percarbonate, potassium perhenate, potassium peroxy molybdate, magnesium peroxy tungstate, or sodium peroxy osmate.

16. The composition of claim 1 further comprising pigment.

17. The composition of claim 1 further comprising water.

18. A composition made by the process of combining a lithographic ink or varnish and catalytic proportions of an inorganic salt of a peracid, wherein the one or more inorganic salts of peracids are persulfate, peroxv disulfate, peroxy stannate, percarbonate, perhenate, peroxy molybdate, peroxy tungstate, or peroxy osmate salts.

19. A composition made by the process of combining a composition comprising a lithographic ink or varnish and catalytic proportions of an inorganic salt of a peracid, wherein the one or more inorganic salts of peracids are persulfate, peroxy disulfate, peroxy stannate, percarbonate, perhenate, peroxy molybdate, peroxy tungstate, or peroxy osmate salts, with water.

20. A method of printing on a surface comprising combining a composition of claim 1 with water immediately prior to application of the resulting composition to the surface, and applying the resulting composition to the surface.

21. A method of sealing two surfaces together comprising combining a composition of claim 1 with water immediately prior to application of the resulting composition to at least one surface to be bonded, followed by contacting said coating with the other surface to which bonding is desired.

22. The method of claim 21 where the resulting composition is applied to both surfaces to be bonded.

23. A method of making a composition comprising combining a lithographic ink or varnish and catalytic proportions of an inorganic salt of a peracid wherein the lithographic ink or varnish comprises from about 10 to about 25,000 parts per million by weight of one or more inorganic salts of peracids.

24. The method of claim 23 further comprising combining water.

25. A method of printing comprising combining a composition of claim 1 with water and applying the resulting composition to a print surface.

26. The method of claim 25, further comprising applying the resulting composition from the combining the composition with water to a printing press.

27. The method of claim 26, wherein the combining occurs immediately prior to applying the resulting composition to a printing press.

28. A composition made by the process of combining a lithographic ink or varnish and catalytic proportions of an inorganic salt of a peracid wherein the lithographic ink or varnish comprises from about 10 to about 25,000 parts per million by weight of one or more inorganic salts of peracids.

29. A composition made by the process of combining a lithographic ink or varnish and catalytic proportions of an inorganic salt of a peracid, with water wherein the lithographic ink or varnish comprises from about 10 to about 25,000 parts per million by weight of one or more inorganic salts of peracids.

30. The composition of claim 1, wherein the inorganic salt of a peracid is, sodium persulfate, sodium peroxy disulfate, calcium peroxy stannate, aluminum percarbonate, potassium perhenate, potassium peroxy molybdate, magnesium peroxy tungstate, or sodium peroxy osmate.

* * * * *